United States Patent
Walter

[15] 3,704,446
[45] Nov. 28, 1972

[54] RUNNING LIGHTS AND DIFFERENTIAL PARKING SYSTEMS FOR VEHICLES

[72] Inventor: Vincent J. Walter, 1557 Woodland Avenue, Wichita, Kans. 67203

[22] Filed: Feb. 9, 1970

[21] Appl. No.: 9,838

[52] U.S. Cl....................................340/74, 315/77
[51] Int. Cl. .............................................B60q 1/26
[58] Field of Search..........340/52, 54, 55, 74, 81, 84; 315/77, 82, 129; 200/5, 6, 8, 9

[56] References Cited

UNITED STATES PATENTS

| | | | |
|---|---|---|---|
| 3,341,736 | 9/1967 | Fortney | 340/54 X |
| 3,110,012 | 11/1963 | Manning | 340/87 X |
| 3,214,730 | 10/1965 | Prewitt | 340/52 D |

Primary Examiner—Alvin H. Waring
Attorney—Robert E. Breidenthal

[57] ABSTRACT

A system and alternate companion systems for visually signaling pedestrians and other motorists that the electrical ignition apparatus of the motor of a vehicle is electrically energized, whereby such persons may be apprised in the interest of safety, whether or not a condition exists that is essential to motor operation. The system entails visual signaling lamps directed outwardly from all sides of the vehicle that are in electrical parallel with the electrical ignition apparatus, voltage regulator or alternator, so as to be concurrently energized therewith. The system optionally includes means for interrupting energization of the electrical ignition apparatus and the lamps immediately prior to and after rotating the motor for starting purposes, such means preferably being incorporated in a conventional multipurpose so-called "ignition switch" and operative to burnish an electrical contact of the latter during an actuating movement thereof.

28 Claims, 15 Drawing Figures

INVENTOR.
VINCENT J. WALTER
BY
Robert E. Breidenthal
ATTORNEY

RUNNING LIGHTS AND DIFFERENTIAL PARKING SYSTEMS FOR VEHICLES

The present invention relates to new and useful improvements in visual signaling systems of motor vehicles, and more particularly pertains to the provision of means for positively signaling to persons remote from a motor vehicle the existence of a condition that must exist during the starting of and the running of the vehicle's motor.

The invention was basically developed from the fact that the present vehicles do not have a parking system since tradition allows the same taillight means to be also used for a parking system. Thus these type of universal objectives only tend to confuse the public.

Since parking lights were rarely used, it was deemed that these so-called parking lights were urgently needed for lifesaving running lights. Thus we bring forth the fact that the parking light circuitry should be independent and visually different from the red tail and amber colored running lights.

Hereinafter various preferred running light plans bring forth a new type of parking system; while the universal system is still maintained in two plans to correspond to the existent parking system. While one system illuminates the new running lights when the headlight switch knob is pulled to its extreme position, the second system is full time and automatic in companionship with the accessory side of any ignition switch. Thus parking lights are produced by the ignition switch when the key is turned to the ACC position or by the usual intermediate position of the headlight switch. The ignition key is favored in view of operative concenience.

The primary object of the invention is to afford appropriate recognition lights for day and nighttime usage so that each vehicle can be easily recognized from any side in any adverse circumstance (fog, steam, ice, smoke, or dust — in combination with the many poor lighting and color conditions) for the common denominators of safety.

It will be hereinafter readily understood that perceptive unawareness is the major cause of accidents since it is only logical that if the driver of the first party knew the driver of the second party was there, he would most certainly avoid these fatal contacts.

An important safety concept is produced by running lights when an inoperative headlight occurs since a dimensional pattern will then eliminate vagueness or conjecture. Pull-out protection that is created by the failure of the operator to pull out the headlight switch control knob is another important object.

Another feature is the advance blinking of the taillights in various starting sequences prior to back-up light selection or rearward movements.

While a natural battery drain condition blinks the said lights, the condition of various starting motor armature segments accentuates these signals. In converse the generator speed intensifies the illumination for another recognizable signal.

As an alternate companion system for side running lights, the generator circuit and/or the alternator means provides illumination that reduces battery drain while energizing the starting circuitry and its running light circuitry. While this type of signaling is not as responsive, self evident, and even delayed for proper motor speeds, it is deemed sufficient for full time side running lights.

Since human error is inevitable, the invention forces the public to now make a proper selection by the now so-called master ignition switch for these genuine running lights providing a distinguishable different parking system is adopted.

While revampment of the headlight switch circuitry was deemed worthy for nighttime running light usage, human errors demanded a full time and automatic system.

An object of the invention is to enable persons viewing a motor vehicle or automobile to determine, even from a remote location, if such motor is running or that an operator selected and controlled condition essential to motor operation exists; especially such persons whose proper decisions, courses of action, and acts of defense, or precautions may necessitate knowledge of whether the motor of such vehicle is running or not.

Another important object of the invention in accordance with the foregoing object is to enable such persons to determine that an attempt, whether successful or not, is being made to start the motor of the vehicle.

Yet another important object of the invention is to enable realization of the foregoing objects by the making of a minor modification of extant and conventional so-called "igni-tion switches" so as to deenergize the ignition system as the ignition switch is moved intermediate the starting and running positions thereof.

A final object of the invention to be specifically enumerated is to provide a conventional "ignition switch" with means operative to effect burnishing of a switch contact while interrupting an electrical circuit through such contact upon manual actuation of such "ignition switch".

Broadly, the subject invention involves, in combination with a vehicle of the type wherein the motor thereof includes an electrical ignition system, with such system including a primary ignition circuit comprised of a breaker switch and a primary ignition coil in electrical series, and a battery and an ignition switch in electrical series for selectively supplying the electrical potential of the battery to the electrical series arrangement of the breaker switch and the primary coil; the improvement comprising electrical lamp means mounted on the vehicle operative in response to electrical energization thereof to direct light outwardly from the vehicle and thereby to be luminously visable from a position remote from the vehicle, said lamp means being connected to the primary ignition circuit in electrical parallel with the electrical series arrangement of the breaker switch and the primary coil for concurrent energization with the latter, whereby a luminous visual indication can be given to persons remote from the vehicle that the ignition circuit of the vehicle is energized.

An important feature of my invention, in a motor vehicle, involves connecting in electrical parallel with electrical ignition apparatus of the vehicle's motor, so as to energize solely concurrently therewith, an electrically operated means for visually signaling to a position remote from the vehicle.

Another important feature of the invention is the mounting of an electrically insulative burnishing element in an "ignition switch" in a position to be slidably engaged by a contact during manual actuation of such switch.

These and other objects, aspects, features and advantages of the invention will become apparent in the light of the ensuing description of a preferred embodiment of the invention, such description to be taken in conjunction with the accompanying drawings illustrative thereof, wherein:

Figures 1, 2, 3, 7:
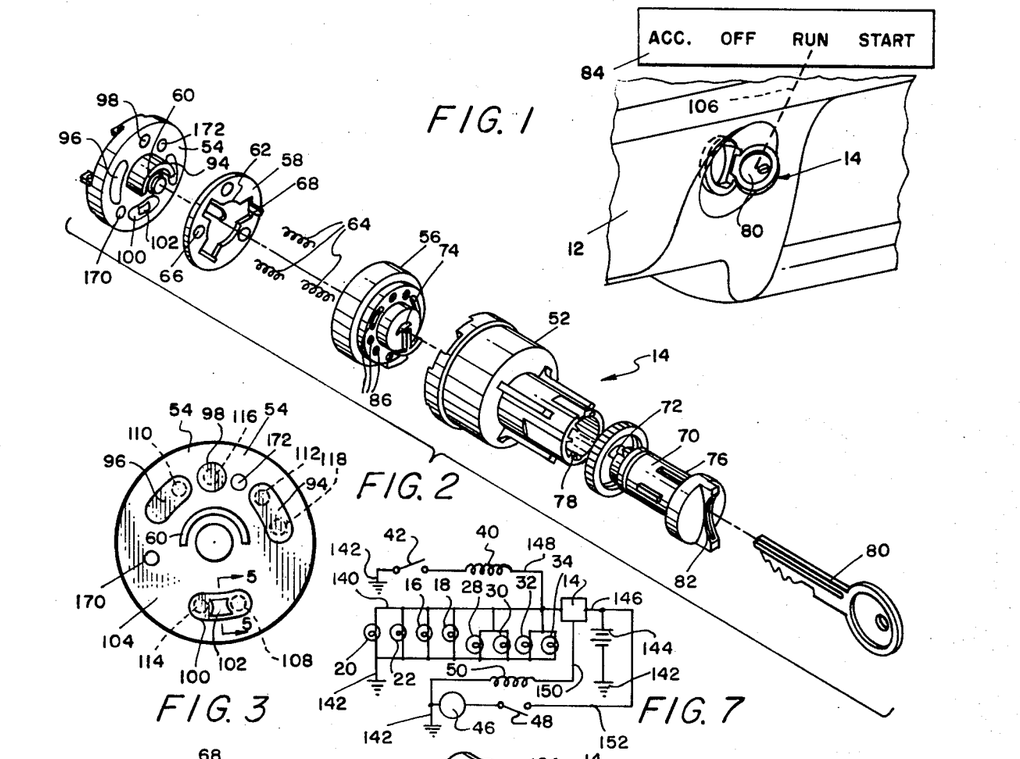
FIG. 1 is a fragmentary isometric illustration of the portion of an automobile instrument panel inclusive of a key-type "ignition switch", together with a legend indicating ignition switch positions.
FIG. 2 is an exploded isometric view of the "ignition switch;"
FIG. 3 is an axial view of the segment plate of the switch from a lock side thereof.
FIG. 7 is a schematic diagram of the signaling system of the form of the invention shown in FIGS. 1–6.

Referring now to the drawings, wherein like numerals designate like parts throughout the various views, the reference numeral 10 designates an automobile or motor vehicle generally, the same including an instrument panel 12 on which are mounted an ignition switch designated generally at 14 and and electrical panel lamps 16 and 18. It will be understood that the switch 14 is accessible for manual actuation by the driver or operator of the automobile 10 and that the lamps 16 and 18 are exposed to the direct view of such operator from his operating position.

The automobile 10 is provided with a pair of conventional electrical lamps 20 and 22 at the front end thereof that are disposed in conventional housings 24 and 26, respectively, for directing light preferentially forwardly, but also to the forward left and forward right. As is conventional, each of the filaments 28 and 30 of the lamps 20 and 22 (preferably in the range of about 4 to 6 candlepower) can be included along with other filaments (not shown) in a single lamp envenlop. While the light directed outwardly from the housings 24 and 26 on energization of the lamps 20 and 22 can be white or of any other color desired (such other colors being conventionally obtained by the corresponding lamp envelope and/or housing including an appropriate color filter), it is preferred, or more accurately, it is recommended that the directed light be of amber color so as to afford a distinction by way of such color and the intensity thereof from other signal lights that are customarily provided on automobiles, such as rear turn signals, etc.

As will be presently described the panel lamps 16 and 18 (which can be such as to emit any selected color of light such as, for example, the same color as selected in the case of the lamp and housing combinations 20 and 24, and 22 and 26) are arranged to be concurrently energized with the lamps 20 and 22, preferably in electrical parallelism therewith so that burn out of a panel lamp will not extinguish either of the front lamps (as would occur in an electrical series arrangement), so that, if desired, an optional conventional dimmer rheostat (not shown) can be provided in series with the panel lamps 16 and 18 to control the brightness of the latter without affecting the intensity of light emitted from the front signal lamps 20 and 22.

The automobile 10 is also provided with rear signal lamp and housing combinations generally similar to the previously described lamp and housing combinations 20 and 24, and 22 and 26, such rear signal lamp and housing combinations being shown as four in number and designated at 28, 30, 32 and 34. Optionally, but preferably forward side lamps 29 and 31 and rear side lamps 33 and 35 are also provided for concurrent energization with the previously described lamps to enhance observation from the sides of the automobile.

Whereas the combination 20 and 24 is disposed adjacent the right front of the automobile 10, the combinations 28 and 30 are adjacent the right rear and are disposed to direct white or a selected color of light such as red rearwardly and to the right rear of the automobile. Similarly, whereas the combination 22 and 26 is disposed adjacent the left front, the combinations 32 and 34 are disposed adjacent the left rear of the automobile 10 to direct white or a selected color of light rearwardly and to the left rear of the automobile 10.

As will be presently described, all the rear lamp combinations 28, 30, 32 and 34 are incorporated in electrical circuits so as to be concurrently energized with the front lamp combinations 20 and 24, and 22 and 26. As will also be explained presently, such concurrent energization of all the previously described lamp combinations as well as of the panel lamps 16 and 18 takes place when and only when a condition exists that is essential to operation of the motor 36 of the automobile 10; such condition being the electrical energization of the electrical ignition apparatus 38 of such motor 36.

It will be understood that the automobile 10 is conventional and that the motor 36 is a conventional internal combustion engine of the type requiring electrical spark ignition of the fuel-air mixture supplied the same, such essential electrical sparking being effected by the conventional ignition apparatus 38 when the electrical series arrangement of the primary coil 40 and the breaker switch 42 (such coil 40 and switch 42 constituting a part of the apparatus 38) is energized and the breaker switch 42 is being opened and closed (as conventionally caused to occur on rotation of the motor 36).

It will also be understood that the motor 36 is conventionally provided with electrical starting apparatus 44, which when energized serves to rotate the motor 36, whereby motor starting can be effected. The starting apparatus 44 conventionally includes a starter motor 46 together with a normally open relay switch 48 that is closed during energization of a relay solenoid 50.

Since the motor 36, including its electrical ignition apparatus 38 thereof, and the electrical starter apparatus 44 therefor as well as the operative relationships thereof are conventional, widely and fully known, further elaboration by way of illustration or description is not necessary and indeed would be undesirable as it would only serve to obscure the actual invention and obfuscate matters generally.

Except as otherwise specifically pointed out and explained in detail, the ignition switch 14 is entirely conventional. The use of quotation marks in connection with such apparatus 14 is for the reason that although such apparatus 14 does include an ignition switch per se (that is, an electrical switch manually operative to control electrical energization of the series arrangement of the coil 40 and breaker switch 42), the ignition switch 14 also incorporates switching elements manually operable to control energization of the starter solenoid 40 as well as incorporating additional switching elements to control energization of various conventional electrically actuated or controlled automobile accessories, not shown, such as instrument panel lamps, radio, tape players (stereo), air circulating fans, air conditioning apparatus or fans thereof, and the like. Such ignition switch 14 is hereinafter referred to the switching assembly 14 to avoid confusion with the ignition switch per se.

The switching assembly 14 is mounted on the instrument panel or dash 12 of the automobile 10 in a position accessible for manual actuation by the operator or driver of the automobile 10. Briefly, insofar as the conventional character of the switch assembly 14 is concerned, the same comprises a metallic barrel 52 that is nonrotatably fixed to the panel 12, with a segment plate 54 of electrically insulative material such as a phenolic resin being fixedly mounted within, disposed at and closing the switch end of the barrel 52. A driver or drive member 56 of electrically insulative material is rotatably received within and is axially slidable within the barrel 52, and an electrically conductive bridging member 58 of annular configuration and of lesser diameter than the segment plate 54 is disposed in the barrel 52 intermediate the plate 54 and the driver 56.

The plate 54, driver 56 and the bridging member 58 are coaxial (such arrangement being facilitated by an integral arcuate boss 60 on the plate 54 being rotatably received through a central opening 62 in the bridging member) and coiled compression springs 64 are interposed between the bridging member 58 and the driver 56 to yieldingly urge them axially apart. Each of the springs 64 has one end seated in a socket (not shown) in the driver 56, and the other end seated in a shallow recess 66 in the bridging member 58. The bridging member 58 is caused to rotate in unison with the driver by reason of the former having integral axially extending tabs 68 thereon that are received in aligned sockets (not shown) in the driver 56. Thus the bridging member 58 is yieldingly urged to bear against the segment plate 54 while being rotatable with the driver 56, while the latter is yieldingly urged to slidably bear against an internal annular shoulder (not shown) in the barrel 52.

Rotary movement is imparted to the driver 56 through a manually rotatable actuator 70 received within the key end of the barrel 52, with the operative connection between the actuator 70 and the driver 56 being by way of an integral lug 72 on the former being received in a socket 74 in the latter.

The freedom of rotation of the actuator 70 in the barrel 52 is subject to the control of conventional key controlled lock means 76 within the actuator 70 that coacts with internal ribs 78 in the barrel 52 to limit or prevent rotation of the actuator except when a key 80 is inserted in a slot 82 in the actuator 70 that communicates with the lock means therein. The character of and use of the key 80 and the lock means 76 is well known and needs no elaboration.

It is also well known that four angular positions or angularly displaced narrow ranges of angular position of the actuator 70 are of special significance in the use of the switch assembly, namely, those corresponding to conventionally labeled positions (indicated at 84 in FIG. 1) normally designated in the angular sequence thereof in a clockwise direction as "ACC" (for engine and starter off with energization of accessories such as a radio), OFF (engine and starter off as well as accessories), RUN (starter off with engine and accessories energized), and START (engine and starter energized and accessories deenergized). In order to yieldingly retain the actuator 70 in each of the four angular positions in which it is disposed, a conventional detent means is provided which comprises shallow recesses 86 in the driver for coaction with protuberances (not shown) in the concealed internal annular shoulder of the barrel 52, the operation of such means being in part a function of the springs 64. In other words, the springs 64 urge the driver 56 so that the protuberances tend to be retained in such recesses 86 in which they are received when the actuator 70 is in one of the four positions.

Figures 4, 6:
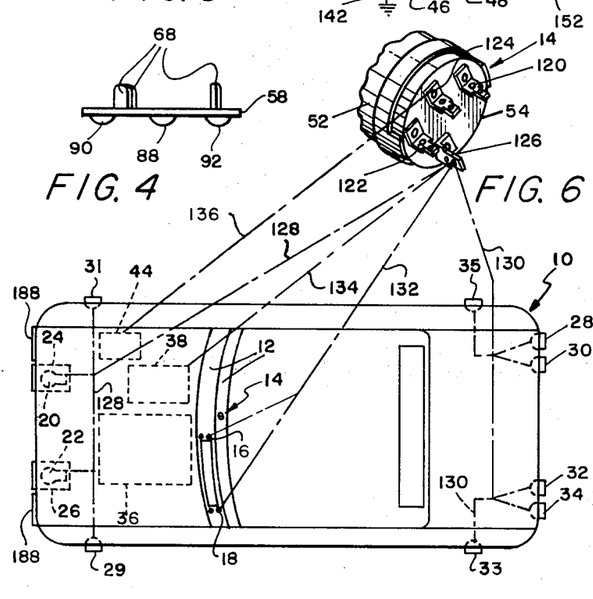
FIG. 4 is a side view of the bridging member of the switch.
FIG. 6 is a diagrammatic view of the terminal end of the switch and indicates the functional relationship of terminals thereof to the signal lamps and electrical starter means of a motor vehicle.

The bridging member 58 is entirely conventional and is formed with three integral, angularly spaced convex regions or contactor portions 88, 90 and 92 directed toward and in sliding contact or engagement with the segment plate 54. Such contactor portions 88, 90 and 92 are formed by stamping or pressing so that the other side of the member is correspondingly concaved, with such concaved regions constituting seats, such as the recess 66, for the near ends of the springs 64.

Figure 5:
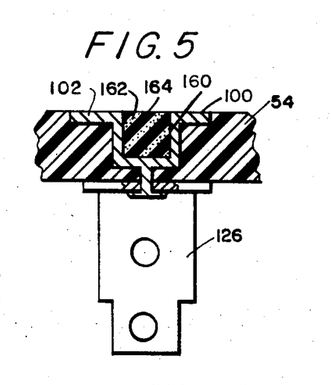
FIG. 5 is an enlarged fragmentary sectional view of the ignition segment, its terminal, and the burnishing element taken upon the plane of the section line 5—5 in FIG. 3.

Except as hereinafter explained in relation to structure shown particularly in FIG. 5, the segment plate 54 is entirely conventional, and has embedded therein an electrically conductive battery segment 94, an electrically conductive accessory segment 96, and electrically conductive solenoid segment 98, and a specially modified (as subsequently described) electrically conductive ignition segment 100. The segments 94, 96, 98 and 100 are exposed toward the bridging member by substantially coplanar surfaces (such as the surface 102 of the segment 100) thereof, such surfaces being coplanar with an annular surface region 104 (concentric with the longitudinal axis of the switch assembly 14) of the segment plate 54.

As thus far described it will be evident that any two of the segments 94-100 are electrically coupled or connected when such two are contacted by any two of the contactor portions 88, 90, and 92 of the bridging member 58. Thus when the actuator 70 and the key 80 are in the "RUN" position indicated by the dashed line 106 in FIG. 1, the contactor portions 88, 90 and 92 are respectively in contact with the segments 100, 96 and 94 at the circularly dashed locations shown in FIG. 3 and indicated respectively at 108, 110 and 112, whereby all such segments are bridged by the bridging member 58 and the battery segment 94 is electrically coupled to each of the segments 96 and 100.

When the actuator 70 is then turned clockwise to the position designated START, the contactor portion 88 moves to an angularly spaced position through an intermediate position to be referred to subsequently to contact the segment 100 at a circularly dashed position 114, while the contactor portion 90 moves to contact the segments 98 at the circularly dashed position indicated at 116, and while the contactor portion 92 moves in contact with the segment 94 to engage the latter at the dashed circular position indicated at 118. Thus when the actuator 70 is in the START position, the segment 94 is electrically coupled to the segments 100 and 98. When the actuator 70 is in the OFF position, none of the contactor portions 88, 90 and 92 is in contact with the battery segment 94, so that the latter is not electrically coupled to any of the other segments 96, 98 and 100. When the actuator 70 is in the position ACC, the contactor portion 88 contacts the battery segment 94 at the circularly dashed position 118, while the contactor portion 92 engages the accessory segment at the circularly dashed position 110, with the contactor portion 90 being out of contact with any of the segments, whereby the battery segment 94 is electrically coupled to only the segment 96.

The segments 94, 96, 98 and 100 are electrically connected through the plate 54 respectively to a battery terminal 122, an accessory terminal 120, a solenoid terminal 124, and an ignition terminal 126 on the side of the plate 54 opposite the bridging member 58 and on the outside of the switch assembly 14 at the end thereof opposite the key 80.

Referring to FIG. 6, the ignition terminal 126 is operatively associated with, that is, connected to the lamp combinations 20 and 24, 22 and 26, and lamps 29 and 31, as indicated by the dash-dot lines 128, and to the lamps 28, 30, 32, 33, 34 and 35, as indicated by the dash-dot lines 130. Also, the ignition terminal 126 is operatively associated to the panel lamps 16 and 18 as indicated by the dash-dot line 132. As is conventional, the ignition terminal 126 is operatively connected to conventional electrical ignition apparatus 38 as indicated by the dash-dot line 134. Thus when the ignition switch is closed (the segments 94 and 100 being bridged by the bridging member 58) all such lamps are energized when and only when the ignition apparatus 38 is energized. It will also be seen that the solenoid terminal 124 is operatively associated with the starter apparatus 44 as indicated by the dash-dot line 136. Thus when the solenoid switch is closed (the segments 100, 94 and 98 being bridged by the bridging member 58), the starter apparatus 44 is energized.

The hereinbefore described conventional structure coordinates or synchronizes the closure of the ignition and solenoid switches in relation to the angular position of the key 80 and the actuator 70.

Referring to the schematic diagram of FIG. 7, each of the lamps 16, 18, 20, 22, 30, 32 and 34 has one terminal connected by a line 140 to the ignition terminal 126 of the switch assembly 14, and their other terminals connected to the common vehicle ground 142 to which one terminal of the vehicle storage battery 144 is connected, the other terminal of the battery 144 being connected by a lead 146 to the battery terminal 122 of the switch assembly 14. Though not shown in FIG. 7, the lamps 29, 31, 33 and 35 are also connected in parallel between the lead 140 and the ground 142. The coil 40 and the engine operated breaker switch 42 are incorporated in series in a lead 148 between the ignition terminal 126 and vehicle ground 142. Thus the series arrangement of the coil 40 and the breaker switch 42 is concurrently energized when and only when the ignition switch is closed, that is when the ignition terminal 126 is energized.

The starter solenoid 50 is disposed in a lead 150 connecting between the solenoid terminal 124 and vehicle ground 142, so that the switch 48 is closed when and solely when the solenoid switch of the assembly 14 is closed, which results in energization of the electric starter motor 46 as the latter is incorporated in series with the switch 48 in a lead 152 connecting between the ungrounded terminal of the battery 144 and vehicle ground 142.

The switch assembly 14 and more particularly solely the plate 54 thereof differs from prior art devices. Such difference resides in the central portion of the ignition segment 100 (as best illustrated in FIGS. 1–3 and 5) being formed to define a recess or pocket 160 opening toward the bridging member 58, with a body 162 of electrically insulative material being disposed in the pocket 160 and fixed to the segment by being press fitted therein or otherwise secured thereto in any suitable manner. The surface 164 of the body 162 is coplanar with the surface 102 of segment 100, and the body is disposed intermediate the circularly dashed positions 108 and 114 (FIG. 3) so that the contactor portion 88 of the bridging member 58 engages the body 160 and is out of contact with the segment 100 as the portion 88 moves through an intermediate fraction of the interval between the positions 108 and 114, such fraction being preferably limited to be such that the contactor portion 88 engages the segment 100 at all times that the contactor portion 90 engages the solenoid segment 98; this to prevent energization of the starter motor 46 when the electrical ignition apparatus is not energized.

In view of the foregoing the ignition terminal 126 will be deprived of the battery's potential for a brief interval every time the actuator 70 is moved clockwise or counterclockwise intermediate the positions thereof corresponding to the RUN and START positions thereof. Consequently, all of the signaling and panel lamps will be energized when the actuator 70 is in or is passing through the RUN position but will be briefly extinguished as the actuator is being moved toward and from the START position, whereby visual flashing signals are produced which will be indicative to external observes that the vehicle operator is starting or attempting to start his engine. The flashing signal from a manual (selective) switch actuation is especially commanding of attention, and this is very important as such can be the prelude to movement of an hitherto motionless vehicle.

If desired or deemed expedient for any reason, such as, for example, economy in manufacturing, the special modification of the segment 100 can be omitted in which event the contactor portion 88 contacts the conventional continuous segment 100 throughout its movement between the locations 108 and 114.

Not only is the provision of the insulative body 162 preferred, but it is especially preferred that the same be in the nature of a so-called "bright boy", that is, be in the nature of an electrically insulative burnishing element. Hence, it is preferred that the body 162 be not only of electrically insulative character but also be of an abrasive character so as to burnish or clean (as of oxides and the like) the contactor portion 88 as the latter slides in contact therewith. Many materials can lend the body 162 such especially preferred character, and of these may be mentioned hard and somewhat rough surfaced ceramics; however, the body 162 can be comprised of a synthetic phenolic resin or the like in which is dispersed a very fine silicon carbide or alumina grit.

Optionally, but preferably, the segment plate 54 has recessed therein additional "bright boys" 170 and 172 so that all of the contactor portions 88, 90 and 92 come into sliding engagement with such burnishing elements during various switch movements so as to keep the contactor portions clean and free of oxides and the like that attenuate current flow in due course. While insert 162 in FIG. 5 brings forth another built-in signaling system, contact plate 58 and its three bridging members, namely 88–90 and 92 are instrumental for a sequence (or interrelated sequence) of events. Thus in the run position prior to rotating of the ignition key 80 to the start position, the said lights are constant. However, in a noninterrupted starting intent, the running lights blink while passing through the run position. In the due course of starting, the said lights now blink again prior to energizing the starting solenoid. While battery drain makes a specific light flickering signal while the engine is cranking, insert 162 momentarily breaks the running lights again while returning the key to the run position 106. Hereinafter the operator may brighten these running lights by normal acceleration for another built-in type of signaling system. Thus in due time the portion of the public that demands vehicular safety will be able to identify each of the said events as to what is actually transpiring while approaching the front or rear (or all sides) as if they were witnessing the said starting sequence while facing the dash 12. Thus the key 80 of the switch 40 becomes a master ignition switch signaling system that forces the public telegraph their errorless intent in any mixed or normal sequence. Even if the ignition key is mistakenly left on the rum position while the motor is not running, the operator may return to the vehicle to present a dead battery. Many operators leave their (headlight-type) parking lights on after leaving their vehicle for a timely adverse result and it shall public to be appreciated that running lights provide full time protection and are automatically off in the OFF position which will eliminate human error and battery depletion.

Figures 8, 9, 10, 11, 15:
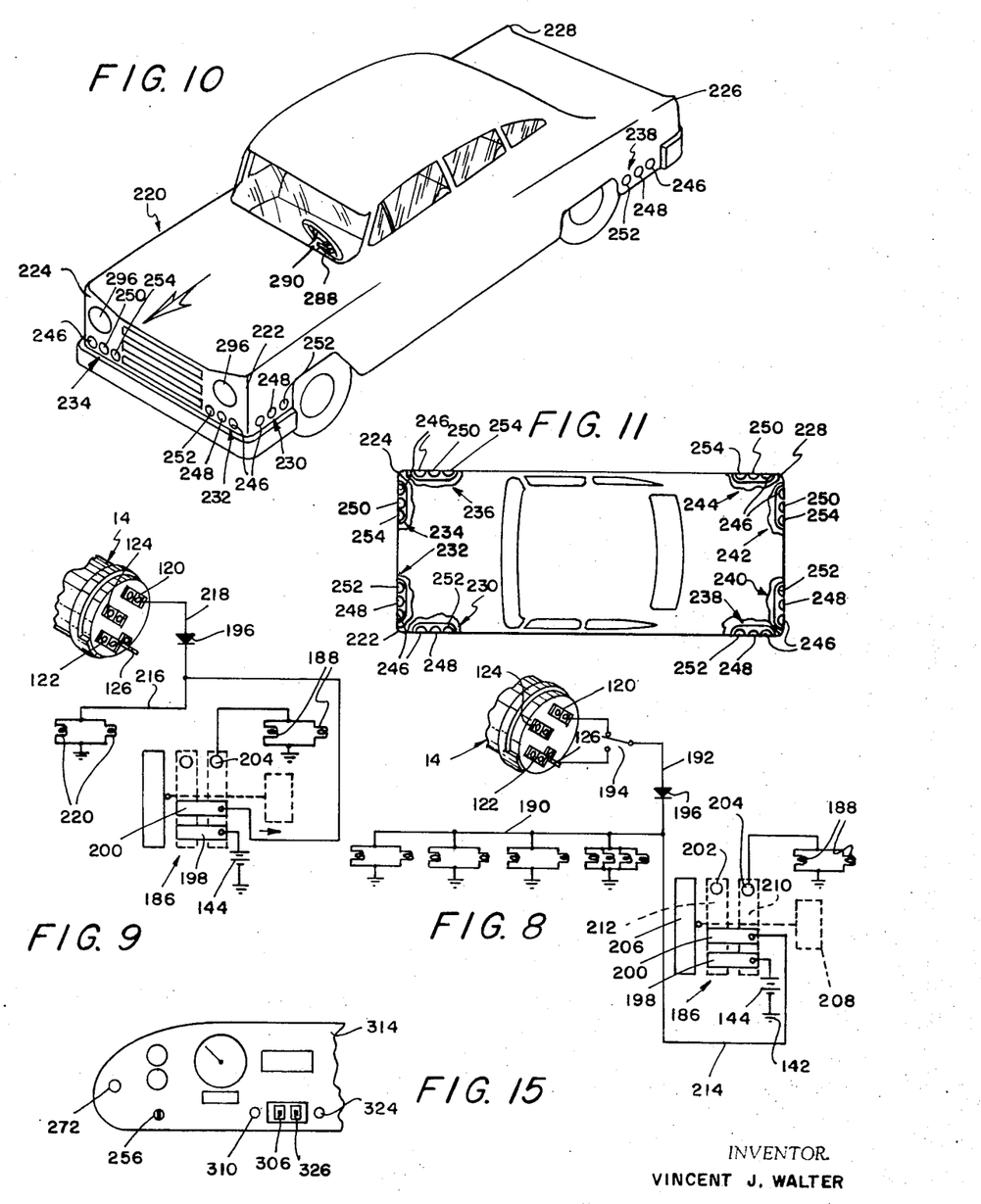
FIG. 8 is a schematic diagram of another embodiment of the invention, wherein a conventional three-position headlight switch is applied in combination with an ignition switch to control the running lamps and the headlight lamps.
FIG. 9 is a modification of the form of the invention shown in FIG. 8, wherein the accessory terminal of the ignition switch controls the running lamps.
FIG. 10 pertains to another embodiment of the invention and is a perspective view of an automobile showing exterior signaling lamp clusters at both sides of each of the four corners of the automobile, with each cluster including a running lamp, a turn signal lamp and a parking signal lamp.
FIG. 11 is a top plan view of the automobile shown in FIG. 10, with portions being broken away to reveal the lamp clusters.
FIG. 15 illustrates a portion of the instrument panel of the automobile shown in FIGS. 10 and 11 and shows the selector switches and indicator lamps such as employed in the electrical systems of FIGS. 12 and 13.

Attention is now directed to an alternative form of the invention which is schematically shown in FIG. 8. This form of the invention causes the running lights to be energized selectively when either the accessory 120 or the ignition 126 terminals of the ignition switch 14 is connected to the battery 144 by appropriate actuation of the ignition switch 14. Additionally or independently the running lights or lamps are coupled to a conventional headlight switch 186 in such a manner that the running lights are energized whenever the headlight switch 186 is actuated to energize the headlights 188 or 296 of the automobile 220. Thus for nighttime usage only, diode 196 and lead 192 can be non-elective. The running lamps 20, 22, 28, 30, 31, 32, 32, 34 and 35 are paralleled between the automobile ground 142 and a lead 190. A lead 192 connects the lead 190 to a single-pole double-throw switch 194 which is in turn connected to accessory and ignition terminals 120 and 126 whereby the lead 192 can be selectively connected to such terminals. A diode 196 is placed in the lead 192 for a purpose to be presently explained. It will be noted that the cathode of the diode faces the lead 190 (a conventional negative ground 142 being assumed), and the anode faces the ignition switch 14.

The headlight switch 186 is conventional and comprises a pair of elongated fixed contacts 198 and 200 and a pair of fixed contacts 202 (not used in this instance) and 204. The switch 186 also includes an elongated movable contact 206, which is normally displaced from the fixed contacts 198–204. The movable contact 206 is movable by a manually actuable knob (shown in dashed outline at 208) from its illustrated position to a position indicated in dashed outline at 210 through an intermediate position indicated in dashed outline at 212.

The elongated fixed contact 198 is connected to the positive terminal of the battery 144 as shown, and the other elongated contact 200 is connected to the lead 190 by a lead 214. When the switch 186 is in its normal (fully open) position shown, the contact 206 does not couple the battery 144 to any of the contacts 202, 204, and 206. When the switch 186 is in its intermediate position (contact 206 in position 212), the contact 206 bridges contacts 198, 200, and 202, and when the switch 186 is fully opened (contact 206 in position 210), the contact 206 bridges the contacts 198, 200, and 204.

As will be recognized by those skilled in the art, the switch 186 is conventionally connected to energize the front and rear universal "parking" lights respectively from the contacts 202 and 200, with the headlights being energized from the contact 204.

It will be additionally recognized by those skilled in the art that the running light plan by the headlight switch means 186 only produces a nighttime plan for a dimensional recognition plan and/or a pattern for inoperative headlights 296. While this plan and other alternate or supplementary plans are the foundation for all other future lighting arrangements, it will be understood that the former standard headlight switch can be readily modified by tie bar connections and/or by jumper wires in a means that connects to the terminal tabs of a standard headlight switch. It should be noted that headlight switch 186 is not the former standard headlight switch since the front park lights were (traditionally) for many years turned out when the headlight switch control knob 208 was pulled to its extreme position. While this plan demeans the safety values of a genuine parking system and/or separate circuitry, the initial headlight switch running light system brings forth rudimentary concepts and means.

In the form of the invention shown in FIG. 8, the parking lamps (referred occasionally in this specification with respect to the forms of the invention shown in FIGS. 1 through 9 by what is thought more appropriate terminology as "running" lamps or lights) 20, 22, 28, 29, 31, 32, 33, 34 and 35 are energized from the contact 200, whereby they are energized when the switch 196 is either in its intermediate (contact 206 at position 212) and full on (contact 206 at position 210) positions. The headlights 188 are energized in the usual manner from the contact 204, with no use being made of the contact 202.

Not only in battery potential applied to the parking light supply lead by use of the headlight switch 186 when in its intermediate and full on positions; but additionally, battery potential is applied to the supply lead 190, when the accessory portion of the ignition switch 14 is on (closed) and the switch 194 is in the position shown, or when the ignition portion of the ignition switch is on (closed) and the switch 194 is in its alternate position connecting the lead 192 to the ignition terminal 126.

The function of the diode 196 is to prevent energization of the lead 192 from the battery 144 through the switch 186, inasmuch as energization of the ignition switch terminals of the ignition switch 14 is to be controlled solely by the ignition switch through its previously described connections to the battery 144. The diode 196 is solid state and has a peak inverse voltage rating higher than the battery voltage and a current rating sufficiently high to handle the average and peak current loads of the parking or running lamps. Preferably the diode is provided with a heat sink, not shown, in accordance with good engineering practice to reduce any possibility of diode failure.

The form of the invention shown in FIG. 9 is a simplified version of the form of the invention shown in FIG. 8, and differs therefrom in essence solely in the supply lead 216 (equivalent to the lead 190 in FIG. 8) being connected via the diode 196 solely to the accessory terminal 120 by a lead 218. The parking or running lights 20, 22, 28, 29, 30, 31, 32, 33, 34 and 35 are schematically symbolized in FIG. 9 by the pair of parallel filaments 220. While the form of the invention shown in FIG. 9 is somewhat less versatile, it is entirely satisfactory as it is usually preferred that the accessory terminal be the source of energization of the running lamps as the latter will not load additional to the load of the electric starter (provided the headlight switch 186 is fully off).

While the diode 196 in the lead 218 can be eliminated for many standard ignition switches, there is a remote possibility that the contact plate 54 and its bridging members 88, 90 and 92 may be in contact with the ACC terminal 96 as best illustrated in FIG. 3 and the solenoid contact 98 while the switch is in an off position. In this event feedback may be experienced to energize the starting motor when the headlight switch control knob is pulled to its intermediate or headlight position. Thus diode 196 would be necessary for a safety factor in the event of careless usage. It should also be noted that in this event, solenoid 98 can be reduced in size to prevent this possibility and additional installation cost of running lights by the accessory terminal 120 means.

In regard to built-in signaling systems that have been heretofore expressed, this plan reduces battery drain (a very insignificant factor) and brings forth a convenience factor in that the so-called universal parking light system now can be illuminated by turning the ignition key 80 to the ACC side or position. Thus parking lights can now be produced by either the existent intermediate headlight switch position or by the ignition switch. The distinct advantage of this plan over other inventive means is that in revamping of the used car criteria, no additional lamps need to be installed as indicated in FIG. 10. While separate parking circuitry is claimed, initiated, and illustrated, a cost ratio with present safety standards are sometimes determining factors.

Attention is now directed to the form of the invention shown in FIGS. 10, 11 and 12, wherein the reference numeral 220 designates an automobile that is conventional except as specifically pointed out hereinafter, such automobile having four corners, namely, left front, right front, left rear, and right rear corners 222, 224, 226 and 228. Lamp clusters 230, 232, 234, 236, 238, 240, 242 and 244 of three lamps each are mounted on the automobile 220. All of the lamps of all of such clusters are outwardly facing and direct light horizontally outwardly in a broad beam or diffused manner. The clusters 230 and 232 are adjacent corner 222 and on the side and front of the automobile; clusters 234 and 236 at the front and rear adjacent corner 224; clusters 238 and 240 at the side and rear adjacent corner 226; and clusters 242 and 244 at the rear and side adjacent the corner. Each cluster of lamps includes three lamps, one of which is a running light or lamp, another of which is a parking light or lamp, and the third of which is a turn signal light or lamp.

The parking lamps are all designated by the reference numeral 246 and are all connected in electrical parallel for concurrent operation.

The turn signal lights or lamps are of two groups, namely, a group that is, as a group, intermittently energized to signal a left turn, and a second group that is, as a group, intermittently energized to signal a right turn. Each of the left turn signal lamps is indicated by the reference numeral 248, it being understood that they are all connected in parallel for concurrent operation. Each lamp of the corresponding group of right turn signal lamps is designated by the reference numeral 250. It will be seen that in view of safety, side turn signal lights designated generally at 248 and 250 can be incorporated by using a double filament bulb. Thus the higher candle power filament will be used for turn signals while the lower candle power filament in the same lamp bulb will illuminate full time side running lights. Thus side run and side turn will eliminate blind spots for many obvious safety advantages.

While all of the running lights can be connected in parallel, it is preferred that such lamps should be equally distributed in two equal groups such as being divided between the four clusters at the front and the four clusters at the rear of the automobile, or alternatively between the equal numbers of clusters nearer the right and nearer the left of the automobile. For example, one group of the running lights can be the four running lamps at the left side of the automobile each of which is designated by the reference numeral 252. Each of the other four running lamps is indicated by the reference numeral 254.

Figure 12:
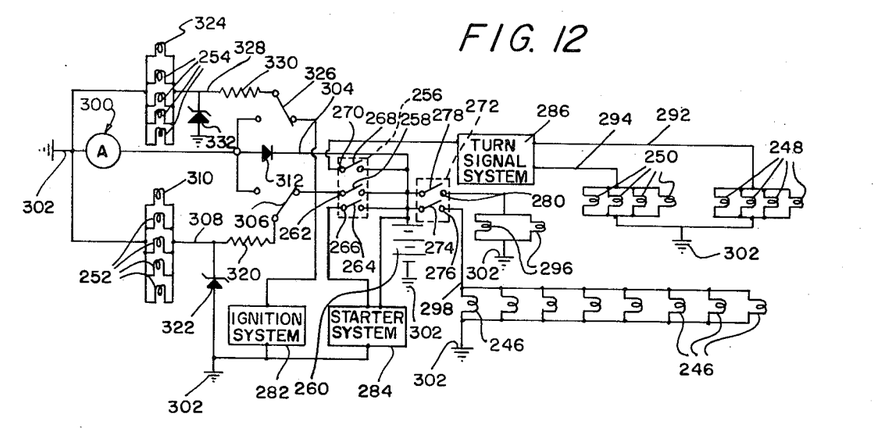
FIG. 12 is a schematic diagram of the electrical system for controlling the energization of the lamps of the clusters and the headlights of the automobile shown in FIGS. 10 and 11.

The automobile 220 is conventional in that the same includes an ignition switch assembly 256 generally similar to the previously described ignition switch 14, such switch assembly 256 being schematically shown in FIG. 12 as inclusive of an ignition switch 258 (which when closed applies battery potential of a battery 260 to the ignition terminal 262), a solenoid switch 264 (which when closed applies battery potential to a solenoid terminal 266), and an accessory switch 268 (which when closed applies battery potential to an accessory terminal 270).

Attention is now directed to yet another form of the invention. Heretofore the inventor has disclosed the fact that from the rearward side — the most important side of any vehicle in regard to parking lights, we do not have a parking system. While FIG. 9 discloses a dual switching means (ignition switch in the ACC side and the headlight switch in the intermediate position) for the same lamp filaments 220, the universal or dual purpose of these lights is not in the best safety interest of the public. The inventor discloses the fact that we must have a specific and distinct parking system as is illustrated in FIGS. 10, 11, 12, 13, and 14 as a distinct and separate parking system. Thus differentially we separate circuitry for running lights and parking lights that can be approved for specific colors to suit new standards. Parking and full time running lights are two basic systems that are some of the A–B–C's of safety.

The automobile 220 also includes a conventional headlight switch assembly 272 that corresponds to the previously described switch 186 and the switch assembly 272 is schematically shown in FIG. 12 as inclusive of a parking light switch 274 that is closed solely when the headlight switch 272 is in its intermediate position (the arrangement being such that the switch contact 276 corresponds to the previously described contact 202). The headlight switch assembly 272 that is closed solely when the switch is fully on (the arrangement being such that the switch contact 280 corresponds to the previously described contact 204).

The automobile 220 includes an internal combustion engine, not shown, that is provided with conventional electrical ignition and electrical starter systems 282 and 284, respectively. The ignition system 282 is conventionally connected to the ignition switch 258 for conventional operation, and the electrical starter system 284 is conventionally connected to the battery 260 and the solenoid switch 264 for conventional operation.

The automobile 220 also includes a conventional flasher-type turn signal system 286 manually controlled in a conventional manner by a control lever 288 mounted on the steering column 290. The system 286 includes a conventional cancellation unit, not shown, for restoring the lever 288 to its neutral position on completion of a turn. The turn signal system 286 has two output leads 292 and 294 that are respectively intermittently energized through the accessory switch 268 from the battery 260 for signaling left and right turns, and such leads are respectively connected to the groups of turn signal lamps 248 and 250. The lamps 248 and 250 are preferably colored red and amber, or any color which may be specified by law for turn signaling.

The automobile is provided with headlights 296 which are energized in a conventional manner through the headlight switch 278 from the battery 260.

The parking lights 246, preferably colored blue (but which can be any color specified by traffic laws or regulations), are connected to the parking switch 274 for parallel energization therethrough from the battery 260 by a lead 298.

The automobile 220 includes conventional engine driven means for supplying direct electric current for energizing electrical equipment and recharging or maintaining the conventional storage battery 260 in a fully charged condition. Such engine driven means can be a direct current generator or an alternating current generator with included rectifying means for obtaining a direct current output. Conventional means are customarily provided for controlling the output voltage and current. In FIG. 12, the reference numeral 300 designates an engine driven producer of voltage and current regulated direct current of the type inclusive of an alternator. The alternator direct current source 300 operates between ground 302 and the positive terminal of the battery 260 via a lead 304.

Means is provided for selectively energizing the left set of running lamps 252 from the battery 260 through the ignition switch 258 or from the alternator source 300. Such selec-tive energization is obtained by the provision of a single-pole double-throw switch 306 enabling selective connection of a lead 308 with either the ignition terminal 262 of the ignition switch 258 or with the alternator source lead 304 as shown. The running lamps 252 are connected in parallel between the lead 308 and the ground 302, as shown, as is also a panel lamp 310. In order to prevent energization of the lamps 252 from the battery 260 when the switch 306 is thrown to couple the lines 304 and 308 directly, a high current rated solid state diode 312 is interposed as shown in the line 304 intermediate the connection of the latter to the switch 306. The panel lamp 310 and the switch 306 are disposed on the instrument panel 314 of the automobile 220 as shown in FIG. 15.

While the lamps 252 and 310 are of such rating as to easily withstand operation at the potential of the battery 260, it may be that such lamps will occasionally be subjected to momentary voltage surges in the output of the alternator 300 even though the line 304 is connected to the battery 260 through the diode. Should such voltages surges be sufficiently great in magnitude or occur with such frequency as to significantly shorten the life of the lamps 252 and 310, means can optionally be provided to limit the voltage to which the lamps are subjected. Such means can conveniently take the form of a resistor 320 interposed in the lead 308 between the switch 306 and the lamps 252 and 310 as shown, with a zener diode 322 being connected between the ground 302 and the line 308 at a position intermediate the resistor 320 and the lamps 252 as shown. The zener diode 322 is selected to have a reverse breakdown voltage substantially in excess of the battery 260, but also substantially less than such voltage as will result in greatly curtailing the life of the lamps 252 and 310.

As mentioned previously, the provision of the voltage limiting means constituted of the resistor 320 and the zener diode 322 is entirely optional, and in most cases can be dispensed with particularly in view of the connection of the lead 304 to the battery 260. An identical scheme is employed to control the energization of the other running lamps 254 and a panel lamp 324 to that already described in connection with the lamps 252 and 310. The means provided for controlling the energization of the lamps 254 and 324 comprises a single-pole double-throw switch 326 that corresponds to the previously described switch 306, such switch affording for a lead 328 selective communication with the lead 304 and the ignition switch 258. As will be evident the lamps 254 and 324 are connected in parallel between the ground 302 and the lead 328. Optional means comprising a voltage dropping resistor 330 and a zener diode 332 is provided for limiting the voltage to which the lamps 254 and 324 are subjected.

It will be seen that all of the running lights 252 and 254 are energized whenever the automobile 220 is in condition for immediate self-propulsion, this being true whether the automatic 220 is stationary or moving. Thus the electrical system of FIG. 12 constitutes for the automobile 220 a full time running light system. It will be quite evident to those skilled in the art that it is essential for the automobile 220 to be in immediate condition for self-propulsion that either one or both of two conditions must prevail, namely, the ignition switch 258 is turned on or the engine driven alternator 300 is in operation, existence of either of these two conditions will energize all of the running lights 252 and 254 as well as the panel lamps 310 and 324. The advantage of selectively energizing either one or both groups of the panel lamps 252 and 254 directly from the output of the alternator is that minor voltage variations will occur in the output of the alternator 300, and this will result in an attention capturing flickering of the running lamps 252 and 254, particularly when the engine is first started or is idling quite slowly. In many respects an automobile constitutes its greatest hazard to pedestrians or other motorists a short interval of time after an engine is started or when the same has been idling slowly, each of such conditions existing normally a short time prior to an automobile changing from a stationary condition to a condition of movement.

Figure 13:
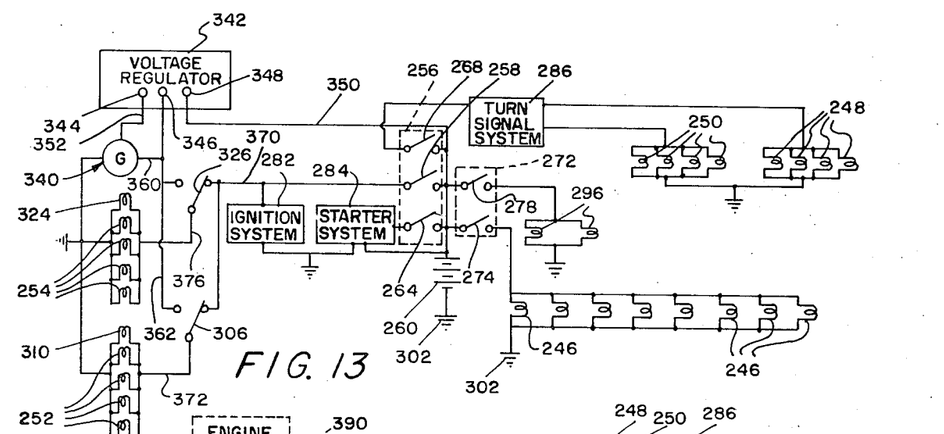
FIG. 13 is a schematic diagram of an alternative electrical system for controlling the energization of the lamps of the clusters and the headlights of the automobile shown in FIGS. 10 and 11.

Attention is now directed to the form of the invention shown in FIG. 13, the electrical control system schematically depicted in FIG. 13 constituting an alternative to that shown in FIG. 12 for use as a part of the automobile 220. The system depicted in FIG. 13 is quite similar in many respects to that shown in FIG. 12, and differs primarily therefrom in the different scheme employed for controlling the energization of the running lamps 252 and 254 as well as of the panel lamps 310 and 324.

In the form of the invention shown in FIG. 13, the reference numeral 340 designates generally an engine driven direct current electric generator of conventional character, and the reference numeral 342 designates a conventional voltage regulator that has the customary provision of a field tap 344, an armature tap 346 and a battery tap or terminal 348. In the usual manner the battery tap 348 is connected by a lead 350 to the storage battery 260 as shown. Also in a conventional manner the field tap 344 is connected to the generator 340 by a lead 352.

As clearly shown in the drawings, the generator 340, the lamps 252, 254, 310 and 324 are grounded. The output lead 360 of the generator is connected to a lead 362 which is in turn connected to the armature tap 346 of the voltage regulator 342.

A lead 370 is connected to the ignition switch 258, and a lead 372 that is connected to the lamps 252 and 310 is selectively connected to the leads 362 and 370 by means of the single-pole double-throw switch 306 as readily apparent on inspection of FIG. 13. In a similar manner, a lead 376 that is connected to the lamps 254 and 324 is selectively coupled to the leads 362 and 370 by means of the single-pole double-throw switch 326. Whenever either of the switches 306 and 326 is in the position shown thereof in FIG. 13, the lamps associated with such switch are energized whenever the ignition switch 258 is closed.

The armature tap 346 of the voltage regulator 342 is normally at ground potential when the generator 340 is not being driven; however, the armature tap 346 carries a voltage that is fluctuating in character whenever the generator 340 is driven, and consequently whenever either of the switches 306 and 326 is actuated to couple its associated lamps to the lead 362, and the generator 340 is being driven, such lamps will be energized with a somewhat pulsating voltage so as to appear to flicker or pulsate in light emiting intensity this pulsating effect being particularly accentuated or apparent when the generator 340 is being driven at low speeds.

The operation of the invention when incorporating the control system shown in FIG. 13 will be readily apparent particularly in view of the previous description of the operation of the invention when including the control system of FIG. 12.

Figure 14:
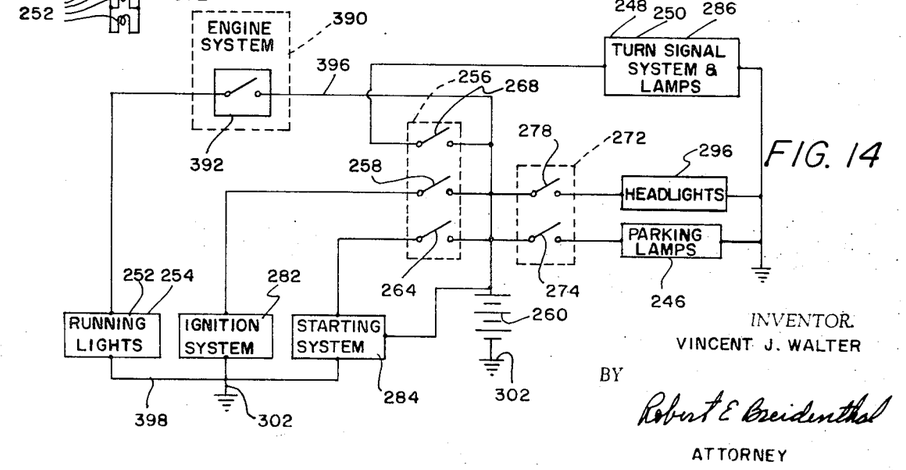
FIG. 14 is a schematic diagram of yet another alternative electrical system for controlling the energization of the lamps of the clusters and the headlights of the automobile shown in FIGS. 10 and 11.

Attention is now directed to another form of the invention which is shown in FIG. 14, the electrical system schematically shown in FIG. 14 being employed in conjunction with the automobile shown in FIGS. 10 and 11. The concept embraced by the electrical system shown in FIG. 14 is considerably broader or of greater scope than that illustrated in FIGS. 12 and 13 in that the same pertains to the broadest concept of providing a means for energizing the running lights 252 and 254 from the battery 260 in response to the closure of a sensing switch means that is sensitive to or responsive to any one of a plurality of conditions reflecting the operation of the engine or prime mover of the automobile 220. In accordance with such concept the reference numeral 390 designates generally the engine system or prime mover of the automobile 220, and the reference numeral 392 designates a normally open sensing switch means which is such as to sense engine operation and to close in response to the same. The switch means 392 can take any one of a variety of forms such as, for example, being in the nature of a conventional pressure sensitive switch operatively associated with the engine system 390 in such a manner as to sense and be closed by a pressure that exists solely when the engine system 390 is in operation. For example, the sensing switch means 392 can be a normally closed pressure sensitive switch connected to the engine oil system downstream of the pump thereof in such a manner that operation of the engine oil pump will result in the sensing switch being exposed to an elevated pressure sufficient to cause closure of the switch when the engine oil pump is in operation. Similarly, the sensing switch means 392 can be coupled to the coolant system immediately downstream of the coolant circulation pump in an arrangement such that the switch is closed when the engine coolant pump is operating. In an analogous manner, the sensing switch means 392 can be of the pressure sensing type coupled to the intake manifold of the engine system 390 in such a manner that when the pressure within the intake manifold is lower than a predetermined amount less that atmospheric pressure, the switch 392 is closed. The sensing switch means 392 need not necessarily be of the pressure sensing type, but can be of the thermal responsive type. For example, the sensing switch means 392 can be coupled to the exhaust manifold of the engine system 390, and be such as to be closed when the temperature of the exhaust manifold or the interior thereof rises above a predetermined level to close the switch. Thus it will be seen that for the purposes of the present invention, the sensing switch means 392 can be of any one of a wide variety of types, it being only necessary that the switch be normally opened, but will close in response to any engine system condition existing that exists only when the engine system is in operation.

The running lights 252 and 254 are connected between the ground 302 and the battery 260 by means of leads 396 and 398, with the sensing switch means 392 being interposed in the lead 396 as shown in such an arrangement that the running lights 252 and 254 are energized solely when the sensing switch means 392 is closed.

From the foregoing, it will be understood that the electrical system shown in FIG. 14 results in what is termed full time operation of the running lights 252 and 254, by which is meant that such lights will be energized whenever the engine system 390 is in operation or has been in operation for a very short period of time. It is recognized that the character of the sensing switch means 392 may be such that the running lights 252 and 254 may be energized for a period of time after cessation of the operation of the engine system 390; however, this is seen to be more in the nature of an advantage rather than a disadvantage in that such time interval may enable the operator of the automobile 220 to leave the automobile 220 and satisfy himself that the running lights are operative and that the switch means is effective eventually to distinguish such lights.

I claim:

1. In combination with a vehicle of the type wherein the motor thereof includes an electrical ignition system, with such system including a primary ignition circuit comprised of a breaker switch and a primary ignition coil in electrical series, and a battery and an ignition switch in electrical series for selectively supplying the electrical potential of the battery to the electrical series arrangement of the breaker switch and the primary coil, and wherein the vehicle is provided with conventional electric headlamps and electric tail lamps; an improvement in the character of means for affording an unequivocal visual indication in the vicinity of the vehicle that the ignition switch thereof is on, with such means comprising electrical lamp means independent of the headlamps and the tail lamps mounted on the vehicle operative in response to electrical energization thereof to direct light outwardly from the vehicle and thereby to be visible from an external position remote from the vehicle, said lamp means being connected to the primary ignition circuit in electrical parallel with the electrical series arrangement of the breaker switch and the primary coil for concurrent energization with the latter, whereby a visual indication can be given to persons remote from the vehicle that the ignition circuit of the vehicle is energized.

2. The combination of claim 1, wherein the lamp means includes a lamp disposed on the vehicle to direct light rearwardly from the vehicle.

3. The combination of claim 1, wherein the lamp means includes a lamp disposed on the vehicle to direct light forwardly from the vehicle.

4. The combination of claim 1, wherein the lamp means is disposed on the vehicle to direct light both forwardly and rearwardly from the vehicle.

5. The combination of claim 1, including electrical means for starting the motor, said means for starting the motor including a starter solenoid inclusive of an electrical solenoid circuit switch, and a manually movable switch actuating means operatively connecting the ignition switch and the solenoid circuit switch for synchronized actuation of such switches, said manually movable switch actuating means being movable between first and second positions through an intermediate position, with solely the ignition switch being closed, both of said switches being open, and both of said switches being closed when said switch actuating means is respectively in said first, intermediate and second positions, whereby said lamp means is energized when the switch actuating means is in its first and second positions, and is deenergized when such means is in its intermediate position to thereby effect a visual indication of the vehicle operator initiating motor operation by blinking of the lamp means.

6. The combination of claim 5, wherein said ignition switch, said solenoid switch and said actuating means therefor is a rotary switch comprising a fixed contactor plate of electrically insulating material, exposed battery, ignition and solenoid contactor segments embedded in said plate, a rotatable bridging member at one side of the plate, said member being of electrically conductive material and having portions thereof in sliding contact with the contact plate, with said segments and said portions of the bridging member being so constructed and arranged that said bridging member is spaced from the solenoid segment while concurrently contacting the battery and ignition segments, is spaced from the ignition segment, and is in contact with all three of said segments when the actuating means is respectively in its first, intermediate and second positions, and switch terminals on the other side of the plate and connector to the segments through the plate.

7. The combination of claim 6, wherein an exposed burnishing element is located in the contactor plate and is disposed to be slidably engaged by one of the portions of the bridging member during movement of actuating means through the intermediate position whereby such portion is burnished.

8. The combination of claim 7, wherein said element is electrically insulative.

9. The combination of claim 8, wherein the element is embedded in the ignition segment in an arrangement such as to effect the recited spacing of the bridging member and the ignition segment when the actuator means is in its intermediate position, for momentary deenergization to thereby effect a visual lamp blinking indication to persons remote from the vehicle that the operator is attempting to initiate motor operation.

10. In combination with a rotary-type ignition switch such as employed in conjunction with the electrical ignition and electrical starter systems of automotive vehicles and of the type including a fixed plate of electrically insulative material in which are embedded exposed battery, ignition and solenoid segments that are arranged to be contacted by portions of a rotary bridging member for selectively electrically isolating the battery segment from both of the other segments, electrically coupling the battery segment to the ignition segment while electrically isolating the same from the solenoid segment, and electrically coupling the battery member is successively rotated through first, second and third angular position ranges; the combination therewith of means for electrically isolating the battery segment from the ignition segment when the bridging member is disposed within an intermediate angular portion of the second positional range of the bridging member.

11. The combination of claim 10, wherein the last said means comprises an exposed element of electrically insulative material embedded in the ignition segment.

12. The combination of claim 11, wherein the embedded element is disposed to be slidably engaged by bridging member and includes an abrasive for burnishing said member.

13. In an automobile of the type wherein there is provided conventional electrical headlamps and electrical tail lamps, and wherein there is an internal combustion engine for propulsion, such engine including an electrical ignition system that must be energized by electrical connection to a source of direct electric current for the engine to be enabled to operate, and wherein ignition switch means is provided in electrical series with a source of direct electric current for selectively connecting the ignition system to the source of direct electric current for selectively energizing the ignition system; the combination therewith of electric signal lamp means on the automobile for producing and directing light outwardly from the automobile when electrically energized and said signal lamp means being connected in electrical parallel with the ignition system and in electrical series with the ignition switch means and the source of direct electric current, whereby selective operation of the ignition switch means to connect the ignition system to the source of direct current also serves to connect the lamp means to the source of direct current for energization of the latter to thereby visually signal to observers remote from the automobile that the engine is enabled to operate.

14. The combination of claim 13, including a second electric switch means for selectively connecting the lamp means to the source of direct current, and means for preventing an operative electrical connection of the ignition system to the source of direct electric current by the second electric switch means, whereby the signal lamps can be energized without energization of the ignition system.

15. The combination of claim 14, including third electric switch means for selectively connecting said electrical headlamps to said source of direct electric current, and means operatively interconnecting the second and third switch means for causing the second switch means to connect the lamp means to the source of direct electric current when the third switch means connects the electrical headlamps to the source of direct electric current.

16. In an automobile of the type wherein there is an internal combustion engine for propulsion, such engine including an electrical ignition system that must be energized by electrical connection to a source of direct electric current for the engine to be enabled to operate, and wherein a multifunction ignition switch means having a common manual control is provided, with said common control being manually positionable in a plurality of positions, and the ignition switch means having a plurality of terminals including a battery terminal, an accessory terminal, and an ignition terminal with the latter connected to the ignition system for energization of the latter; said ignition switch means being operative (a) to prevent electric current flow therethrough between the battery terminal and either of the accessory and the ignition terminals when the manual control is in a first position, (b) to prevent an electric current there-through between the battery terminal and the ignition terminal while establishing an electric connection therethrough between the battery terminal and the accessory terminal when the manual control is in a second position, and (c) to establish electric connections therethrough between the battery terminal and each of the accessory and ignition terminals when the manual control is in a third position; a grounded electric storage battery having one terminal connected to said battery terminal and constituting the source of direct electric current, said ignition system being electrically connected to the ignition terminal for electrical energization therefrom; the combination therewith of electric signal lamp means on the automobile for producing and directing light outwardly from the automobile when electrically energized, and said signal lamp means being electrically connected to the accessory terminal for electrical energization therefrom when the manual control is in its said second and third positions.

17. The combination of claim 16, including a second electric switch means electrically connected between said terminal of the battery and the signal lamp means for electrically energizing the signal lamp when the second electric switch means is closed.

18. The combination of claim 17, including means for preventing the flow of electric current between the terminal of the battery and the accessory terminal through the second electric switch means.

19 In an automobile of the type that includes an engine for propulsion and an electric storage battery together with means driven by the engine for charging the battery; the combination therewith of electric signal lamp means on the automobile, means connecting the signal lamp means to the means for charging the battery for energizing the signal lamp means, and means for preventing energization of the signal lamp means from the storage battery, whereby the signal lamp means are energized when and solely when the engine is operating.

20. The combination of claim 19, wherein the automobile is of the type including a voltage regulator and wherein the means for charging the battery includes a direct electric current generator, with the means for preventing energization of the signal lamp means being constituted of the voltage regulator.

21. The combination of claim 19, wherein the automobile is of the type wherein the means for charging the battery includes an alternator having a rectified current output, with the means for preventing energization of the signal lamp means comprising a diode interposed between the battery and the connection of the signal lamp means to the alternator.

22. In an automobile of the type including an internal combustion engine for the propulsion thereof, with such engine being effective on initiation of operation thereof to initiate the existence of a physical condition that continues during engine operation, with cessation of engine operation being effective to terminate existence of such physical condition; the combination therewith of normally open electric switch means, sensing means for closing the electric switch means during the existence of said physical condition, electric signal lamp means on the automobile for producing and directing light outwardly from the automobile during energization thereof, and a source of direct electric current, said source, switch means and signal lamp means being in electrical series.

23. The combination of claim 13, including a second electric signal lamp means on the automobile for producing and directing light outwardly from the automobile when electrically energized, and electric circuit means including an electric control switch for selectively energizing the second electric signal lamp means from the source of direct electric current.

24. The combination of claim 23, wherein each of said lamp means includes a plurality of electric incandescent filament lamps, a pair of lamp clusters disposed at spaced positions about the periphery of the automobile, with each of said clusters being comprised of a pair of electric incandescent filament lamps, one of such pair of lamps being of the first mentioned signal lamp means and the other of the second signal lamp means.

25. The combination of claim 24, including left turn electric signal means including an electric incandescent filament lamp with means for selectively energizing such lamp from the source of direct electric current, a right turn electric signal means including an electric incandescent filament lamp with means for selectively energizing such lamp from the source of direct electric current, one of said pair of clusters including a lamp of the left turn signal means, and the other cluster including a lamp of the right turn signal means.

26. The combination of claim 19, including a second electric signal lamp means on the automobile for producing and directing light outwardly from the automobile when electrically energized, and electric circuit means including an electric control switch for selectively energizing the second electric signal lamp means.

27. The combination of claim 26, wherein each of said lamp means includes a plurality of electric incandescent filament lamps, a pair of lamp clusters disposed at spaced positions about the periphery of the automobile, with each of said clusters being comprised of a pair of electric incandescent filament lamps, one of such pair of lamps being of the first mentioned signal lamp means and the other of the second signal lamp means.

28. The combination of claim 27, including left turn electric signal means including an electric incandescent filament lamp with means for selectively energizing such lamp, a right turn electric signal means including an electric incandescent filament lamp with means for selectively energizing such lamp, one of said pair of clusters including a lamp of the left turn signal means, and the other cluster including a lamp of the right turn signal means.

* * * * *